United States Patent [19]
Schutze et al.

[11] Patent Number: 5,955,822
[45] Date of Patent: Sep. 21, 1999

[54] FLANGE UNIT FOR THE ACTIVE SUPPRESSION OF VIBRATIONS

[75] Inventors: Rainer Schutze; Joachim Block, both of Braunschweig, Germany

[73] Assignee: Deutsches Zentrum fur Luft-und Raumfahrt e. V.

[21] Appl. No.: 09/047,027

[22] Filed: Mar. 24, 1998

[30] Foreign Application Priority Data

Mar. 24, 1997 [DE] Germany .............................. 19712292

[51] Int. Cl.⁶ ................................................. F16F 15/02
[52] U.S. Cl. ........................................ 310/328; 310/311
[58] Field of Search .................... 310/311, 322, 310/328

[56] References Cited

U.S. PATENT DOCUMENTS

| | | | |
|---|---|---|---|
| 3,558,935 | 1/1971 | Horan | 310/328 |
| 4,031,418 | 6/1977 | Cluzel et al. | 310/328 |
| 4,633,119 | 12/1986 | Thompson | 310/325 |
| 4,944,222 | 7/1990 | Tyren | 310/327 |
| 5,030,873 | 7/1991 | Owen | 310/337 |
| 5,306,979 | 4/1994 | Schwarz | 310/328 |
| 5,523,983 | 6/1996 | Morningstar et al. | 367/154 |

FOREIGN PATENT DOCUMENTS

| | | | |
|---|---|---|---|
| 39 39 822 C2 | 10/1993 | Germany | F16F 15/02 |
| 195 24 080 C1 | 8/1996 | Germany | F16S 3/00 |
| 59-65640 | 4/1984 | Japan | F16F 15/03 |
| 6-200975 | 7/1994 | Japan | F16F 15/02 |
| WO 96/36462 | 11/1996 | WIPO | B25J 18/02 |

*Primary Examiner*—Thomas M. Dougherty
*Attorney, Agent, or Firm*—Salter & Michaelson

[57] ABSTRACT

In a flange unit for the active suppression of vibrations, in which the flange unit is arranged between a vibration generator and a rigid structure, the flange unit has two flanges (2, 3), between which an actively controllable pressure-generating element (50), at least two fiber composite loops (60) and a tube (30) are arranged.

20 Claims, 1 Drawing Sheet

FLANGE UNIT FOR THE ACTIVE SUPPRESSION OF VIBRATIONS

BACKGROUND OF THE INVENTION

1. Field of the Invention

The invention relates to a flange unit for the active suppression of vibrations, the flange unit being arranged between a vibration generator and a rigid structure.

2. Discussion of the Related Art

A vibration damping device is known from JP 59-65640 A1 which in automotive technology is installed between the motor vehicle engine and the body of the vehicle. This vibration damping device comprises a combination of an electrostrictive element as well as a rubber-like elastic section. The electrostrictive element is exposed to a changing voltage, the cycle of which corresponds to that of the vibration curve of the transmitted vibrations. This is to result in a mutual elimination of the vibrations caused by the deflection of the electrostrictive element and of the unwanted vibrations of the motor vehicle engine.

Asynchronous high-frequency vibrations or low-frequency vibrations caused by shaking are additionally absorbed by the rubber-like elastic sections.

DE 39 39 822 C2 also describes an active vibration damping system for a motor vehicle. In this case, a piezo-ceramic actuator comprising several individual elements is used which are layered one above the other in such a way that they form a pillar acting as an elongator surrounded by a bourdon tube. Disturbance vibrations detected by a sensor are directed to a control unit and the signals passed to the piezo-ceramic actuator as control variables.

These vibration damping systems usable in motor vehicles are not generally usable and are also unsuitable for taking transverse forces into consideration.

It is known from DE 43 10 825 C1 and DE 195 24 080 C1, in the case of a rod with a tubular wall made of carbon fibre composite, to arrange an actively controllable pressure-generating element within the rod or on the outside and in the interior of the rod. Such an actively controllable pressure-generating element then abuts on the face side against pressure discs which abut against the face sides of the two rod elements. In the case of DE 43 10 825 C1, above the region of the actively controllable element on the outside of the tubular wall of the rod, a bushing is arranged which engages over the adjoining ends of two rod elements, is adhered to these and acts as a spring, through which restoring forces are exerted.

In DE 195 24 080 C1, a ring-shaped pressure-generating element, which is actively controllable, is arranged on the outside in the region of the separating gap between two rod elements. This element abuts on the face side against shoulders formed by elements lying on the adjoining ends of the rod elements and firmly connected to the surface of the rod elements. The two rod elements are axially guided by the ring-shaped pressure-generating element. The two rod elements are pressed away from one another for the cylindrical ring-shaped element. The likewise axially active, second pressure-generating element provided in the interior of the rod between the two rod elements acts against this force. This second element has fibre loops engaging over it on both sides which are directed over dome-shaped projections. The loops are preferably displaced at 90° relative to one another. A change in length of the inner axially acting, pressure-generating element is transferred to the two rod elements via the loops. Such a change in length pulls the two rod elements together.

A piezo-element is preferably used in the two publications (DE 43 10 825 C1, DE 195 24 080 C1) for the pressure-generating elements.

The rods described in the two publications are principally installed in latticework structures and, fitted with a corresponding control means, can suppress vibrations of the latticework there. The rods may be passively heavily loaded and are actively operated in a desired load range. However, it is not always possible to build vibration generators, e.g. driving motors, into latticework structures so as to enable vibrations to be suppressed with active rods such as those described in the two publications.

Rather, it is frequently the case that such vibration generators or driving elements are fastened to structures of a different type, e.g. box structures. It has been shown that in that case any active influence may then only be made on the fastening of the structures on the vibration generators or the seat of the driving elements.

SUMMARY OF THE INVENTION

Therefore, the object of the invention is to provide a flange unit for the active suppression of vibrations, in which the flange unit is arranged between a vibration generator and a structure, whereby the flange unit can also absorb transverse forces.

As a result, a flange unit for the active suppression of vibrations is provided, which can absorb both pressure and tensile forces as well as transverse forces. A very quick reacting adaptation to load change can occur by changing the fed electric voltage by the provision of an actively controllable pressure-generating element, in particular in the form of a piezo-element. A precise adjustment of the initial load of the actively controllable pressure-generating element can advantageously occur in a testing machine by providing a fine thread in a pressure plate, in particular a metal pressure plate. As a result of this, fibre loops in the interior of the flange unit advantageously receive an initial tensile load, and the controllable pressure-generating element receives a selectable initial pressure load. A rigidity to shear in the outer region of the flange unit can advantageously be provided by the provision of a tube, in particular a carbon fibre composite (CFRP) tube with a ±45° orientation of the fibres.

In principle, a flange unit for the active suppression of vibrations is provided, in which the flange unit is arranged between a vibration generator and a structure and has two flanges, between which an actively controllable pressure-generating element, at least two fibre composite loops and a tube are arranged. The actively controllable pressure-generating element is preferably a piezo-element. It is advantageously arranged centrally between the flanges. Several fibre composite loops are preferably arranged around the actively controllable pressure-generating element. It is particularly preferred that these are directed from the first flange to the second, are threaded through two openings there and directed back again to the first flange and also threaded through openings there. The tube, in particular a CFRP tube or also an aluminium tube, is preferably arranged on the outside between the two flanges. It is particularly preferred that this is inserted positively between the two flanges.

Pressure stresses of the flange unit are directed via the two flanges, which, particularly preferred, are made of carbon fibre composite, and the actively controllable pressure-generating element. In contrast, tensile forces are directed from one flange to the other via the fibre composite loops.

The transverse forces acting on the flange unit are absorbed by the externally located tube. The actively controllable pressure-generating element, in particular the piezo-element as piezo-actuator, expands when an electric voltage is applied and as a result expands the fibre composite loops. These act as spring elements here. The rigidity of the spring elements is adjustable in broad ranges by the selection of an appropriate fibre material and an appropriate number of fibre composite loops.

To enable optimum operation, the actively controllable pressure-generating element should be pre-stressed. For this purpose, a mechanical adjustment possibility is preferably provided. This is achieved in a particularly preferred manner in that the piezo-actuator is supported on one side via an insulation disc against a pressure plate, which is screwed into a metal sleeve element by means of a fine thread. The metal sleeve element is itself arranged in an appropriate opening or hole in a flange plate. To generate a bias of the piezo-element, the entire flange unit is drawn apart in a testing machine with a defined force. The pressure plate is guided via the fine thread. The flange unit is then released again, as a result of which the piezo-element is in a pressure bias load state and the fibre composite loops in an initial tensile load state.

While the flange unit is being expanded, any difference in length occurring can be reset for the externally arranged tube by preferred provision of adjustable rings or adjusting rings and adjusting screws, which are distributed over the periphery of the flange unit. Since the tube is inserted positively between the two flanges, it is particularly preferred, when using a carbon fibre composite (CFRP) tube, to provide a reinforcement of the two edges of the CFRP tube by means of unidirectional fibre ring windings. A lateral displacement of the CFRP tube is advantageously avoided as a result of this.

BRIEF DESCRIPTION OF THE DRAWINGS

For more detailed explanation of the invention an embodiment of a flange unit for the active suppression of vibrations is described below on the basis of the drawings. These show in.

DETAILED DESCRIPTION

Figure 1:
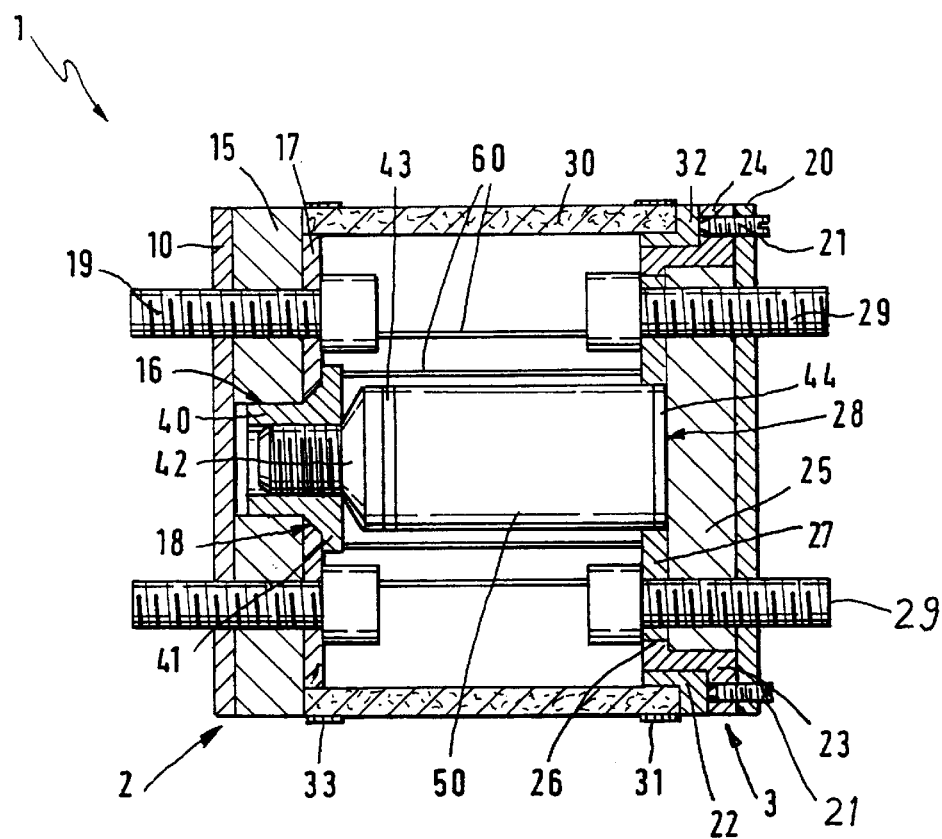
FIG. 1 is a lateral sectional view of a flange unit according to the invention.

FIG. 1 shows a lateral sectional view of a flange unit 1 according to the invention. The flange unit 1 has two flanges 2, 3. The flange 2 has an external cover disc 10, flange 3 has an external cover disc 20. Adjusting screws 21 are distributed over the periphery in the peripheral region of the cover disc 20. The adjusting screws 21 abut against a displaceable ring 22 with their foot region. The displaceable ring is preferably made of steel. A further ring 23 is arranged between the cover disc 20 and the displaceable ring 22. The ring 23 is likewise preferably made of steel. The adjusting screws 21 are screwed into the external periphery of a collar 24 of the steel ring 23.

A flange plate 25 is inserted positively into the steel ring 23. The flange plate 25 is preferably made from carbon fibre composite (CFRP). However, it may also be made of aluminium.

The flange plate 25 is held towards the flange unit 1 in a shoulder 26 of the steel ring 23. In this region, a thin flange plate 27 with a central, preferably round opening 28 is arranged as ring-shaped flange plate.

Screws 29 are passed through the external periphery of the ring-shaped flange plate 27 facing the shoulder 26 of the ring 23. At their end, they protrude out of the cover disc 20. The head region of the screws 29 abuts against the internal side face of the ring-shaped flange plate 27 in the interior of the flange unit 1.

The displaceable steel ring 22 forms a collar 32. A tube 30 abuts positively at its one end against this collar 32 at the outer periphery of the displaceable ring 22. When using a CFRP tube, an orientation of the woven fabric of ±45° is preferably provided. As a result of this, the tube exhibits a rigidity to shear and resistance to transverse forces. When using a CFRP tube, a unidirectional fibre ring winding 31 is provided on the outside of the tube 30 in the region of the positive abutment against the displaceable ring 22. The tube 30 may also be made of aluminium, for example.

At its other end, the tube 30 abuts against a wide ring flange plate 15 of the flange 2. The flange plate 15 is preferably made from carbon fibre composite (CFRP). However, it may also be made of aluminium, for example. In contrast to the flange plate 25 of flange 3, the ring flange plate 15 is fitted with a central opening 16 and with such a diameter that it closes flush with the outer periphery of the tube 30.

The ring flange plate 15 is covered by the cover disc 10 on its outside. A ring-shaped flange plate 17 is provided on its inside. The ring-shaped flange plate 17 is very much thinner than the ring flange plate 15. It has a central opening 18 like the ring-shaped flange plate 27. However, the opening is conical in shape.

A sleeve element 40 is arranged in the opening 18 of the ring-shaped flange plate 17 and the opening 16 of the ring flange plate 15. The sleeve element has a cylindrically shaped section, a conically tapering section and an external collar 41. The collar lies on the internal face of the ring-shaped flange plate 17. The sleeve element is inserted positively into the openings 16, 18 of the two flange plates 15, 17. The sleeve element is preferably made from metal. It has an internal thread as fine thread.

Screws 19 are directed through the two flange plates 15, 17 and the cover disc 10. The screws 19 protrude at their lower ends out of the surface of the cover disc 10. The screw heads abut against the internal face of the ring-shaped flange plate 17 in the interior of the flange unit.

A pressure plate 42 is screwed into the sleeve element 40. For this purpose, the pressure plate 42 has a portion fitted with an external thread as fine thread. The actual pressure plate adjoins this portion via a conically projecting section. An insulation disc 43 is arranged on the surface of the pressure plate 42. The insulation disc 43 serves for insulation of an actively controllable pressure-generating element 50, in particular a piezo-element, arranged between said insulation disc 43 and the two flange plates 27, 25. The piezo-element is arranged in the opening 28 of the ring-shaped flange plate 27 via an insulation disc 44. It is held positively therein.

Fibre composite loops 60 are arranged around a piezo-element 50. The fibre composite loops 60 are preferably fastened respectively on the ring-shaped flange plate 17 at both ends. The loops 60 are threaded through openings, not shown in FIG. 1, within the flange plates 27, 25 and 17, 15. Hence, they are threaded from the flange plates 15 and 17 through flange plates 27 and 25, and are directed back to flange plates 15 and 17, and are threaded through openings in flange plates 15 and 17. The fibre composite loops are preferably made of carbon fibre composite.

A fibre ring winding 33, corresponding to the unidirectional fibre ring winding 31, is provided at the end of the tube 30 lying on the ring-shaped flange plate 17 and supported positively against the flange plate 15 also for reinforcement of this edge when a CFRP tube 30 is used.

The tube 30 is preferably not glued in between the flange plates 15, 17 and the displaceable ring 22, but arranged positively therebetween. The reason for this is that the entire flange unit is drawn apart with a defined force in a testing machine to adjust an initial load of the piezo-element 50. The preferably metal pressure plate 42 is subsequently guided in the sleeve element 40 via its fine thread. Relief of load of the flange unit then occurs. As a result, the piezo-element 50 is in an initial pressure load situation and the fibre composite loops 60 in an initial tensile load situation.

While the flange unit is being drawn apart, i.e. expanded, an adhesive connection of the tube 30 and the flanges 2, 3 is destroyed. The length difference resulting in the interior of the flange unit from the adjustment of the sleeve element with the fine thread is reset preferably by adjusting the adjusting screws 21 and the resulting pressing against the displaceable ring 22 as adjusting ring. This is expedient to adapt the tube 30 inserted positively between the displaceable ring and the flange plate 15.

If a vibration generator, such as a driving motor or driving element, for example, to the flange unit, via the screws 19, and a rigid structure, in particular made from carbon fibre composite, is connected to the flange unit via the screws 29, the pressure loads generated by the vibration generator are introduced into the piezo-element 50 via the flange plates 15, 17. By supplying an electric voltage, the piezo-element 50 expands.

The fibre composite loops 60 act on the flange plates 15 and 25. They serve here as spring elements, their rigidity being adaptable by an appropriate selection of the fibre material for the fibre composite loops 60 and by appropriate selection of the number of fiber composite loops 60. During the supply of an electric voltage to the piezo-element and during its expansion, the fibre composite loops 60 are expanded.

When using a CFRP tube 30, transverse forces acting on the flange plate 15 or 17 are absorbed by the advantageous provision of a ±45° orientation of the fibres of tube 30.

The active suppression of vibrations allows optimum adjustment of the force distributions for introduction into or within the structures. Disturbing vibrations of the structure can thus be counteracted by a deliberate introduction of appropriate forces into the structure. The respective actively controllable pressure-generating piezo-element 50 should thereby be constructed to be as quick acting as possible so as to be able to absorb corresponding vibrations as soon as they occur.

Alternatively, instead of a piezo-element 50 an alloy-based element with shape memory capability may also be provided, the length of which may be varied in dependence upon the acting force and/or temperature.

Figure 2:
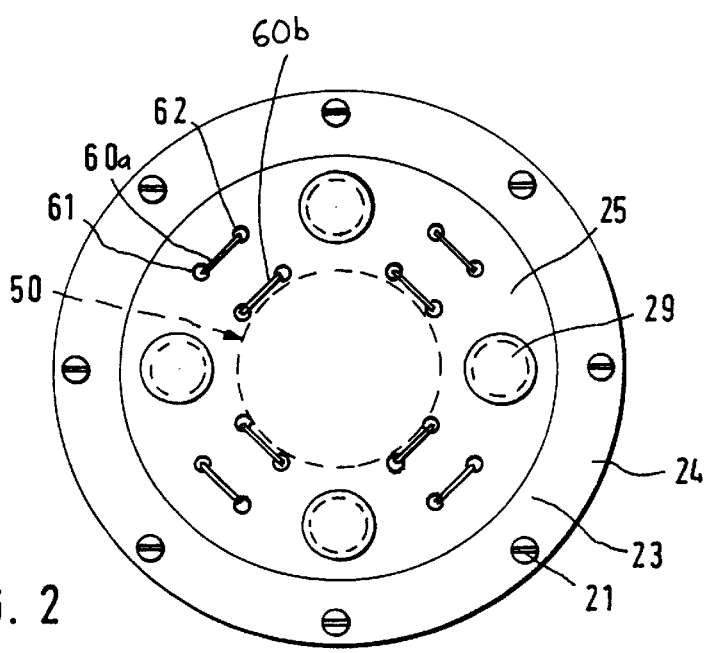
FIG. 2 is a front view onto the flange unit according to FIG. 1, shown without a cover disc.

FIG. 2 shows a front view onto a flange unit 1 on the side of the cover disc 20, but with the cover disc 20 removed. Eight adjusting screws 21 are provided on the outer periphery of the ring 23, each arranged symmetrically distributed over the periphery of the ring 23. Four screws 29 are arranged symmetrically distributed over the periphery of the flange plate 25. The thread-through points of the fibre composite loops 60 are arranged respectively between the four screws 29. Two openings 61, 62 for each fibre composite loop 60 are respectively provided in a flange plate 25 for threading the fibre composite loops 60 therethrough. A fibre composite loop 60a arranged further outwards on the edge of the flange plate 25 and a fibre composite loop 60b arranged further inwards in the region of the piezo-element 50, indicated in broken lines by a circle are respectively provided. A front view onto the side of the cover disc 10 (not shown) would similarly show a corresponding illustration with respect to the thread-through points of the fibre composite loops.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A flange unit for actively suppressing vibrations, the flange unit being supported between a vibration generator and a rigid structure, the flange unit comprising an actively controllable pressure-generating element, at least two fiber composite loops and a tube supported between a first flange and a second flange.

2. The flange unit according to claim 1, wherein the actively controllable pressure-generating element is arranged essentially centrally between said first and second flanges, a plurality of fiber composite loops (60) are arranged symmetrically around the actively controllable pressure-generating element (50), and the tube is externally of said actively controllable pressure-generating element, between a ring flange plate of the first flange and a displaceable ring of the second flange.

3. The flange unit according to claim 1, wherein said first and second flanges and said actively controllable pressure-generating element absorb pressure stresses of the flange unit, the fiber composite loops direct tensile forces from the first flange to the second flange (3), and the tube (30) absorbs transverse forces acting on the flange unit (1).

4. The flange unit according to claim 3, wherein the fiber composite loops (60) act as spring elements having a rigidity which is adjustable by the selection of fiber material for the fiber composite loops and the number of fiber composite loops.

5. The flange unit according to claim 4, wherein the actively controllable pressure-generating element is a piezo-element, which is in a pre-stressed state.

6. The flange unit according to claim 5, characterised in that said pre-stressed state is achieved by mechanical adjustment.

7. The flange unit according to claim 5, wherein one end of the piezo-element abuts an insulation disc disposed against a pressure plate which is supported by a sleeve element in the first flange, and allows a fine adjustment of a pressure pre-stress of the piezo-element.

8. The flange unit according to claim 7, wherein the sleeve element and the pressure plate are made of metal.

9. The flange unit according to claim 7, wherein the sleeve element is arranged in an opening of the ring flange plate and is positively inserted in a conical opening of a second ring flange plate supported by the ring flange plate.

10. The flange unit according to claim 9, wherein the tube is positively coupled between the first flange plate and a displaceable ring (22), said displaceable ring being supported by said second flange plate.

11. The flange unit according to claim 10, wherein the displaceable ring interact with adjusting screws which are distributed over the periphery of the second flange to permit a length adjustment of the tube inside the first and second flanges.

12. The flange unit according to claim 1, wherein the tube is a carbon fibre composite tube, fibers of said tube forming a an angle of ±45° with a plane which is perpendicular to a longitudinal axis of said tube.

13. The flange unit according to claim 12, further comprising unidirectional fiber ring windings provided at proximate opposite edges of the tube for reinforcement of said edges.

14. The flange unit according to claim 1, wherein the first flange comprises a first cover disc a first ring flange plate having an opening, a second ring flange plate having a conical opening and a number of screws disposed through said first cover disc for fastening said flange unit to said vibration generator; and wherein the second flange comprises a second cover disc, a flange plate, a third ring flange plate having an opening, a ring disposed around the flange plate and having a ring collar for guiding adjusting screws therethrough, and a displaceable ring abutting against an outer periphery of the ring and against the ring collar and a number of screws disposed through said second cover disc for fastening said flange unit to said rigid structure.

15. The flange unit according to claim 11, wherein the pressure plate is screwed into the sleeve element in the first flange so as to be located in the interior region of the flange unit ajacent the insulation disc, one end of the actively controllable pressure-generating element being in abutting relationship with said insulation disc, the other end of said actively controllable pressure-generating element being inserted into the opening of the third ring flange plate, and wherein the fiber composite loops arranged around the actively controllable pressure-generating element are directed from the first flange to the second flange, pass through the flange plate and the third ring flange plate, are threaded through openings on an upper side of the flange plate, and are directed back again to the first flange, through openings in the ring flange plate and the second ring flange plate.

16. A flange unit for actively suppressing vibrations, the flange unit comprising:

a first flange and a second flange, the first flange being coupled to a source of vibration and the second flange being coupled to a rigid structure;

an actively controllable pressure-generating element supported between said first and second flanges; and a plurality of continuous, elongate members which interconnect said first and second flanges.

17. The flange unit of claim 16, further comprising a tube disposed between said first and second flange, said tube being supported by a periphery of each of said first and second flanges.

18. The flange unit of claim 17, said first flange comprising first and second flange plates, each having an opening, a sleeve element inserted into said openings of said first and second flange plates and a pressure plate threadably coupled to said sleeve element;

wherein said actively controllable pressure-generating element is supported at one end thereof by said pressure plate.

19. The flange unit of claim 18, said second flange unit comprising a third flange plate and a fourth flange plate in abutting relationship with each other, said fourth flange plate having an opening therein;

wherein said actively controllable pressure-generating element is supported at another end thereof by said third and fourth flange plates.

20. The flange unit of claim 19, further comprising a number of adjustment devices for adjusting a distance between said first and second flanges.

* * * * *